UNITED STATES PATENT OFFICE.

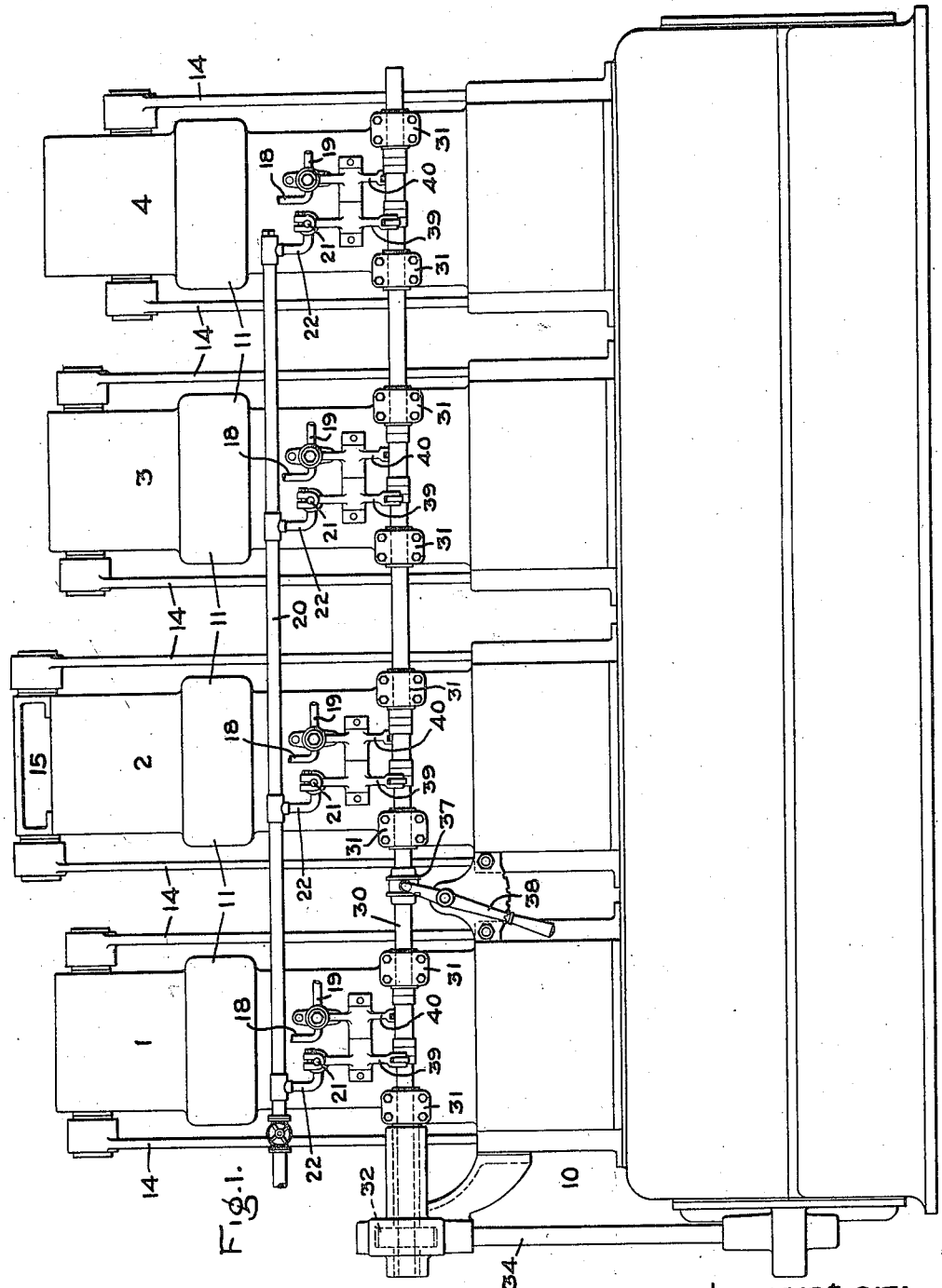

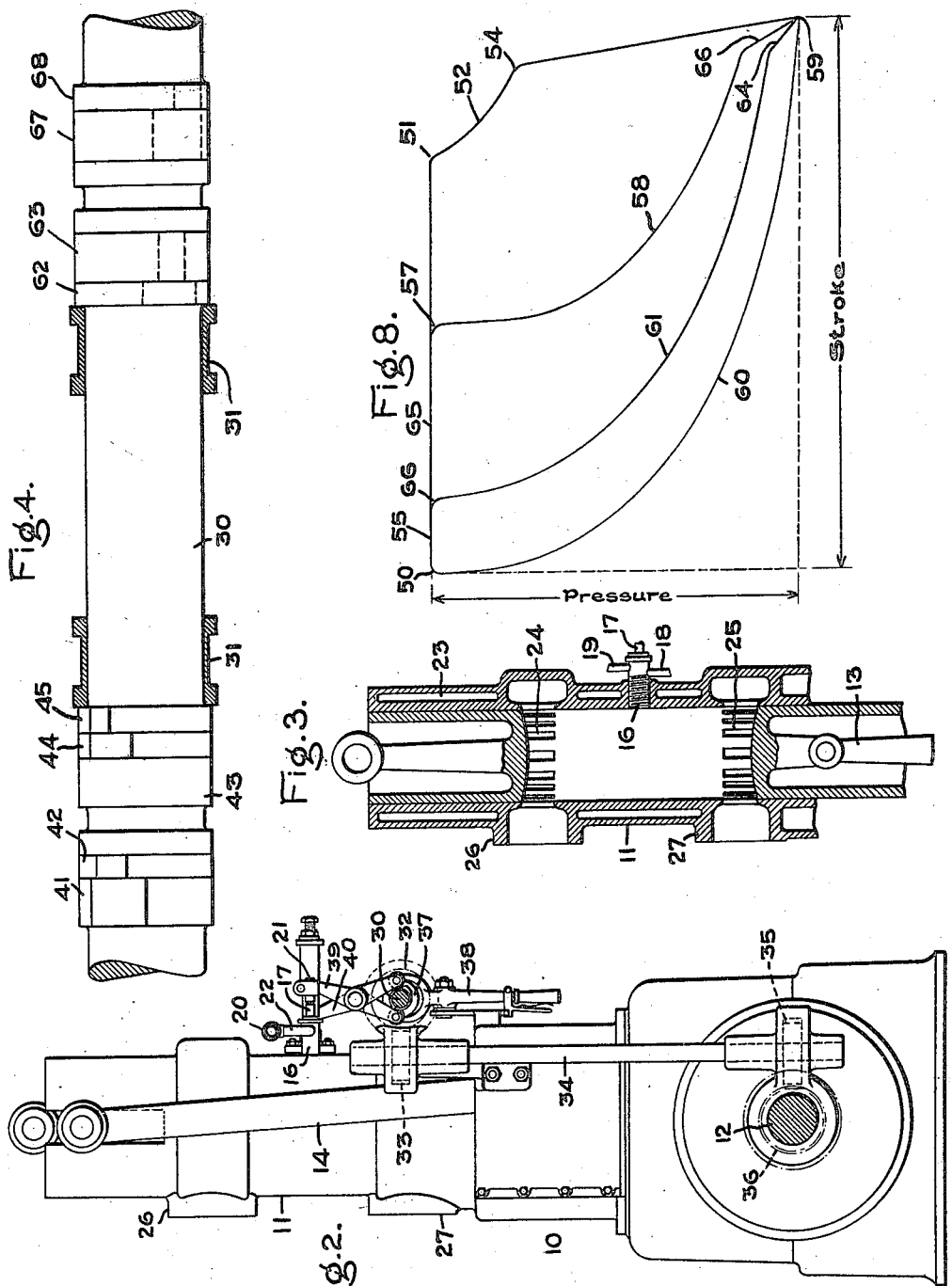

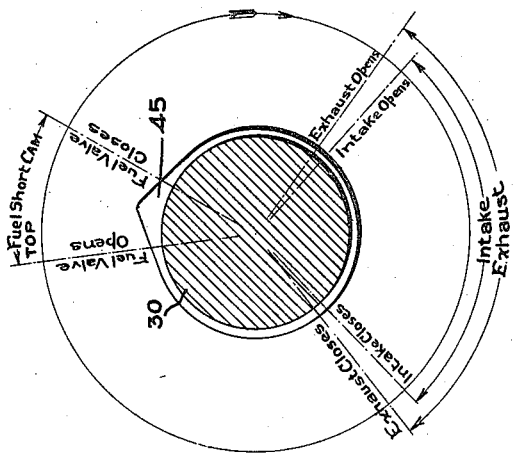
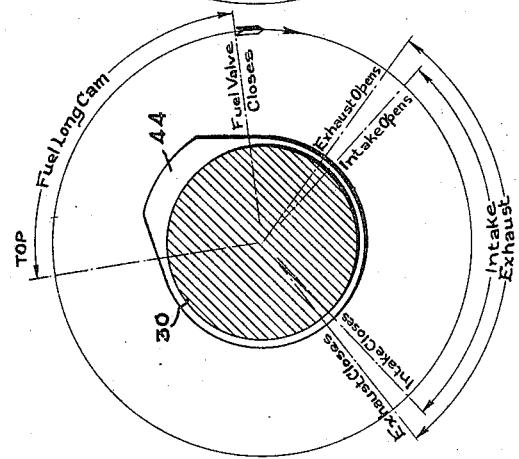
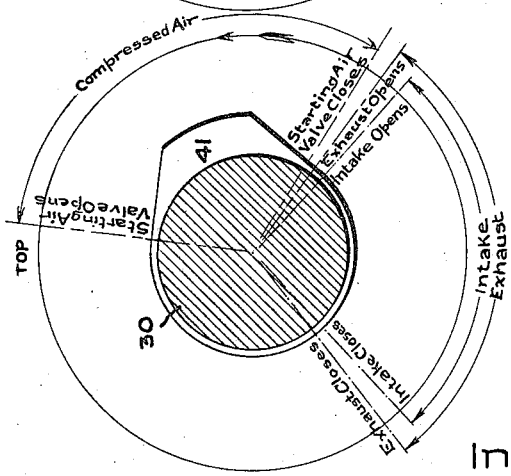

HENRI G. CHATAIN, OF ERIE, PENNSYLVANIA, ASSIGNOR TO GENERAL ELECTRIC COMPANY, A CORPORATION OF NEW YORK.

METHOD OF AND APPARATUS FOR CONTROLLING MECHANISM FOR INTERNAL-COMBUSTION ENGINES.

1,223,935.        Specification of Letters Patent.     Patented Apr. 24, 1917.

Application filed August 30, 1912. Serial No. 717,895.

*To all whom it may concern:*

Be it known that I, HENRI G. CHATAIN, a citizen of the United States, residing at Erie, county of Erie, State of Pennsylvania, have invented certain new and useful Improvements in Methods of and Apparatus for Controlling Mechanism for Internal-Combustion Engines, of which the following is a specification.

As is well understood the ordinary internal combustion engines cannot be started under any substantial load, and for this reason clutches and speed changing gearing are provided. A good example of this is found in the standard automobiles of today.

My invention has for its object to overcome this great defect and to provide an improved engine and controlling mechanism therefor, which engine will freely start under any load up to its rated maximum. My invention also has for its object to improve the method of starting internal combustion engines.

In carrying out my invention, I employ a two-cycle engine of the constant pressure type and utilize heavy oil as a fuel. The engine may be provided with as many cylinders as desired but to attain the best results there should be an even number. Each cylinder is preferably, but not necessarily, provided with a pair of oppositely moving pistons which are connected by rods to the main shaft. These pistons preferably, but not necessarily, control the exhaust and scavenging ports. On the compression stroke a charge of pure air is highly compressed and its temperature raised above the igniting temperature of the fuel. Fuel is injected into the cylinder under an air pressure considerably higher than the compression pressure existing therein. This fuel is admitted by one or more injectors under the control of a needle valve or valves. A supply of compressed air under suitable pressure for starting purposes is also provided and stored in tanks or bottles of suitable strength and capacity. The admission of air from said tanks to the cylinder is controlled by a starting valve and the fuel and air starting valves of all of the cylinders are actuated by cams that are under the control of the operator.

Assuming the case of a four cylinder engine for example, a cycle of operation which embodies my invention and which I now prefer is as follows:—The cams are adjusted to admit compressed air to all four cylinders, then the air valve is opened and the engine starts as an air motor, the fuel valves of all cylinders being idle. After the engine begins to turn over, the cams are shifted by hand to the second position in which both fuel and air are admitted to two cylinders, say Nos. 2 and 4, for example, cylinders Nos. 1 and 3 acting as an air motor, as before. In this position, the quantities of fuel and air admitted to Nos. 2 and 4 are greater than are required for normal operation at full load. The increase in quantity of fuel may be accomplished by holding the fuel valve open for a longer period than is used for normal operation. The increase in air supply above that required in normal operation is secured by opening the compressed air starting valve at a point shortly after the beginning of the expansion stroke. In other words this auxiliary supply of high pressure air, as it may be termed for convenience and distinction, is introduced after the fuel has been ignited. This subsequent admission has the object of increasing the torque developed by the engine, but the real point in delaying it is to give the fuel an opportunity to be well ignited, since otherwise said air might so chill the air compressed by the working piston or pistons as to prevent ignition from taking place.

For the third operating condition, the cams are shifted by hand so as to admit fuel to cylinders Nos. 1 and 3 in the same manner as above described in connection with cylinders Nos. 2 and 4. Under these conditions all of the cylinders are operating with larger amounts of air and fuel than under normal conditions. For the fourth operating condition the cams are shifted by hand so as to cut off the supply of compressed air from the external source and the fuel valves are operated by their normal or short cams and the engine operates in the normal manner, its speed being controlled by varying the admission of fuel in any suitable manner.

The cycle of operation as just described comprises four steps and is the one which I now prefer, but it is to be understood that I am not necessarily limited thereto as my invention may be carried out by modified cycles, such as come within the scope of the claims.

In the accompanying drawings which illustrate one of the embodiments of my invention, Figure 1 is a view in side elevation of a multi-cylinder oil engine; Fig. 2 is an end view thereof; Fig. 3 is a sectional view of one of the cylinders; Fig. 4 is a detail view of the cam shaft; Figs. 5 to 7 are turning diagrams of the cams; and Fig. 8 is a curve illustrative of the different operating conditions.

Referring to Figs. 1 to 3, 10 indicates the base of the engine and mounted thereon are cylinders 11 which for convenience are numbered 1 to 4 inclusive. In each cylinder is a pair of oppositely moving pistons that are connected to the main shaft 12 by connecting rods 13, Fig. 3, and by side rods 14 and cross-heads 15, Fig. 1. Each cylinder is provided with an injector 16 of any suitable construction and a needle or fuel valve 17. To each injector is connected a fuel supply pipe 18 leading from a pump and a pipe 19 leading from an air compressor. The air pipes 19 may advantageously be connected to the main supply pipe 20. To simplify the illustration the pump and compressor have been omitted. Each cylinder is also provided with a valve 21 for admitting compressed air received from the pipe 22, the latter connecting with the main air pipe 20 or a separate source of supply.

The cylinders have water jackets 23 and also exhaust ports 24 and scavenging air ports 25, said ports being controlled by the outer and inner pistons respectively. The exhaust ports communicate with the exhaust conduit 26 and the scavenging ports with the air supply conduit 27. Air for scavenging purpose may be received from any suitable source, for example from one of the stages of an air compressor.

Extending across the front of the engine cylinders is a cam shaft 30 which is capable of both rotary and longitudinal movements. It is supported in bearings 31 and on its left end is splined a gear 32 that meshes with a gear 33 on the vertical shaft 34, Fig. 2. On the lower end of the shaft is a gear 35 that meshes with a gear 36 on the main shaft 12. Being a two-cycle engine, the cam shaft runs at engine speed. Mounted on the cam shaft is a collar 37 that receives the forked end of the hand shifting or starting lever 38, the latter having four positions as indicated by the latch-receiving notches in the quadrant. By moving the lever from notch to notch the various portions of the starting cycle are obtained. Briefly stated, the positions of the lever result in the following:—

First position: Starting all four cylinders on air.

Second position: Operating two cylinders on air and two on air and fuel.

Third position: Operating all four cylinders on air and fuel.

Fourth position: Running position with all cylinders on regular fuel charge.

The cam shaft is provided with a series of cams for each of the compressed air and fuel valves as will appear more particularly in connection with Figs. 4 to 7. Each air valve is provided with an operating lever 39 and each fuel valve with an operating lever 40, said levers being provided with rollers that are arranged upon opposite sides of the shaft.

Referring to Fig. 4, the cam shaft 30 is provided for cylinder No. 1 with an air starting cam 41 of the shape and position shown in Fig. 5. This cam is of a length to cover the first two positions of the starting lever 38. To the right of cam 41 is another cam, 42, whose circumferential length is less than that of cam 41. Cam 42 is operative in the third position of the starting lever 38 and supplies the auxiliary air to its cylinder to supplement the torque of the piston due to the burning of the combustible in the cylinder. The portion of the shaft to the right of cam 42 is concentric with the shaft axis because the air starting valve should be idle and in its closed position when said portion registers with the valve lever. This coincides with the fourth position of the lever 38. The cam shaft at a point opposite the fuel valve lever is provided with a concentric portion 43 of a width corresponding to two positions of the lever 38 and also with a fuel cam 44 of the shape and location shown in Fig. 6. This cam corresponds to the third position of the lever 38. Adjacent to the fuel cam 44 is a fuel cam 45 that is used in normal running and corresponds to the fourth position of the starting lever 38.

For the cylinder No. 2, the cam shaft is provided with cams of the character and position shown at the right of Fig. 4. The air starting cam 62 which is operative in the first position of the starting lever 38 is shaped like cam 41. The air starting cam 63, which is operative in the second and third positions of the starting lever 38 is shaped so as to open the compressed air starting valve of cylinder No. 2 at a point shortly after the beginning of the expansion stroke, i. e. after the fuel is ignited, and to close it earlier than it would close if operated by cam 62. The portion of the cam shaft immediately to the right of cam 63 is concentric with the shaft axis, and corresponds to the fourth position of the starting lever, 38.

The fuel cams for cylinder No. 2 are shown at 67 and 68. The portion of the cam shaft immediately to the left of cam 67 is concentric with the shaft axis, and corresponds to the first position of the starting lever, 38. Cam 67 operates in both the second and third positions of starting lever 38, and is shaped so as to open the fuel valve of cylinder No. 2 at a point near the beginning of the expansion stroke and to hold it open longer than it is held during normal operation of the engine. Cam 68 operates in the fourth position of the starting lever 38, and is shaped so as to close the fuel valve of cylinder No. 2 in the position required for normal operation of the engine. The cams for cylinder No. 3 have the same relative arrangement as the cams of cylinder No. 1, but are angularly displaced 180° and the cams of cylinder No. 4 have the same relative arrangement as the cams of cylinder No. 2, but are angularly displaced 180° and hence further description is unnecessary.

The turning diagrams Figs. 5, 6 and 7 in addition to showing the three types of cams and their angular positions show the exhaust, intake and compression portions of the strokes.

Referring to Fig. 8, I have shown curves illustrative of the various actions of my improved mechanism. Starting for convenience at point 50, (it being assumed that some one cylinder, for example No. 1, contains a compressed charge of air) compressed air on being admitted to the cylinder by the cam 41 starts the pistons into operation. At point 51 the compressed air valve closes and the air then in the cylinder gradually expands, the pressure decreasing as indicated by the line 52 to the point 54 where the exhaust ports are uncovered by the outer piston and the pressure drops to atmosphere represented by the base line of the diagram. This action is being duplicated on all four cylinders. Assuming now the second position of the starting lever 38 and cylinders Nos. 2 and 4 receiving fuel under the control of the long cams 44: 50 indicates for each cylinder the beginning of the expansion stroke. The line from 50 to 51 indicates the admission of air, without fuel, to cylinders 1 and 3, as before. The line from 50 to 57 indicates the admission of fuel and air to cylinders 2 and 4. At point 57 cam 63 and cam 44 respectively allow the compressed air starting valves and the fuel valves of cylinders 2 and 4 to close, and the cylinder contents then expand, with decreasing pressure as shown by line 58. The sequences of events for cylinders 2 and 4 in the third position of the starting lever are like those for the second position.

In the fourth position of the starting lever the supply of air and fuel is the same for all four cylinders, and is indicated by lines 60, 55, 61 and 64. This represents the action with the engine running under normal conditions.

Considering now the fourth position of the starting lever 38 with the engine running under normal conditions: Starting at 59, as the pistons in each cylinder move toward one another, the pure air admitted through the scavenging ports is compressed as indicated by the line 60. The pressure rises to point 50 where the temperature is above that of the igniting point of the fuel admitted. At 50 the fuel valve opens and closes at 66. From this point the pressure drops as indicated by the line 61, until the exhaust ports are opened by the outer piston and the operation is repeated. A comparison of the lines 60 and 61 with the lines 60 and 58 and with lines 60 and 52 of the diagram will show the difference in power developed by cylinders when running under normal and under starting conditions.

I have shown all of the cams arranged to be shifted simultaneously by the same lever but the invention is not necessarily limited thereto, although I believe it to be the preferred arrangement since it insures the proper action in the proper sequences and leaves less to the individual judgment of the operator.

After the engine is started its power and speed are controlled by varying the amount of fuel admitted in any suitable way, as for example by varying the amount of fuel delivered to the injectors by the fuel pumps.

It is to be understood that the fuel pump or pumps delivering fuel to the cylinders must be capable of supplying the amount of fuel made necessary by the use of the long fuel cams. As an illustration, but not as a limitation of my invention, the pump or pumps should supply approximately twice as much fuel to the engine during the particular portion of the starting cycle when fuel is injected as when the engine is working under normal conditions.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The method of starting an internal combustion engine under load which consists in admitting high pressure elastic starting fluid alone to the cylinder thereof to start the piston, injecting an amount of fuel larger than that normally required to operate the engine into the cylinder together with said elastic starting fluid until the engine is brought up to the desired running speed, and subsequently cutting off the supply of elastic starting fluid and cutting down the fuel to the amount normally required for the load at that speed.

2. The combination in an internal combustion engine having a fuel admission valve and an air starting valve, of a mechanism for operating said valves to start the engine under load, comprising means for operating the starting valve to admit air to start the piston, means for simultaneously operating both the air starting valve and the fuel valve to admit starting air and more than the amount of fuel normally required for the load, and means for shutting off the air starting valve and admitting only the amount of fuel normally required for the load.

3. The method of starting a multi-cylinder internal combustion engine which consists in admitting an elastic starting fluid alone thereto under relatively high pressure to start the pistons, injecting fuel into one or more of the cylinders together with elastic fluid, injecting fuel into the remaining cylinder or cylinders, and finally cutting off the supply of elastic starting fluid, and admitting fuel in the normal manner.

4. The method of starting a multi-cylinder internal combustion engine which consists in admitting high pressure fluid to all of the cylinders, introducing fuel into some of the cylinders together with the said fluid, introducing fuel into all of the cylinders together with the said fluid, and cutting off the supply of said fluid and admitting fuel.

5. The method of starting a multi-cylinder internal combustion engine which consists in admitting air to the cylinders under a sufficiently high pressure to start the pistons and their load into motion, injecting fuel to certain of the cylinders in addition to the charges of air and under a pressure at least equal to said air pressure, injecting fuel into all of the cylinders together with the charges of high pressure air, and cutting off the supply of high pressure air, and admitting fuel to the cylinders in the normal manner.

6. The method of starting a multi-cylinder high compression internal combustion engine under load which consists in admitting high pressure starting air alone to the cylinder to start the pistons into motion and cause them to successively compress air in the cylinders to a temperature above the igniting point of the fuel, injecting charges of fuel into the cylinders under a pressure greater than the compression pressure and that of the high pressure air and causing it to burn in the presence of the high pressure air, said charges of fuel being greater in quantity than that required to normally carry the load and being admitted until the engine is brought up to the desired running speed, shutting off the supply of starting air, and decreasing the quantity of fuel admitted to that normally required to carry the load at that speed.

7. The method of starting a multi-cylinder internal combustion engine under load, which consists in first admitting high pressure elastic fluid to the cylinders in sufficient quantities to start the engine and its load, then introducing high pressure elastic fluid only to certain of the cylinders and injecting fuel by compressed fluid and introducing elastic fluid to the other cylinders, said elastic fluid being admitted to the last named cylinders after ignition takes place therein to supplement the power developed thereby, and finally introducing sufficient fuel by compressed air to all of the cylinders to drive the engine and its load under normal running conditions.

8. The method of starting a multi-cylinder internal combustion engine under load, which consists in supplying all of the cylinders with compressed air, supplying certain of the cylinders with fuel and also with compressed air after ignition takes place therein, and finally injecting fuel to all of the cylinders in sufficient amounts to drive the load under normal conditions.

9. The method of starting a multi-cylinder internal combustion engine under load, which consists in admitting elastic fluid to the cylinders in sufficient quantity and under sufficient pressure to start the engine and its load, introducing elastic fluid alone to certain of the cylinders and quantities of fuel in excess of the normal requirements to the remaining cylinders, introducing air to said latter cylinders in addition to that used to inject the fuel, introducing quantities of fuel to all of the cylinders in excess of the normal requirements, introducing air to said latter cylinders in addition to that used to inject the fuel, and introducing by compressed air to the cylinders reduced amounts of fuel to drive the engine and its load under running conditions.

10. In an internal combustion engine, the combination of a piston and cylinder, means for injecting a high pressure elastic fluid to start the piston into motion, means for injecting more than the normal amount of fuel into the charge of elastic fluid contained in the cylinder, means for shutting off the supply of elastic fluid, and means for supplying fuel charges in normal amounts.

11. In a multi-cylinder internal combustion engine, the combination of a plurality of pistons and cylinders, means for injecting high pressure air to all of the cylinders to start the pistons into motion, means for injecting more than the normal quantity of fuel into some of the cylinders simultaneously with the air, means for injecting more than the normal amount of fuel into the remaining cylinders, means for shutting off the supply of air, and means for supplying normal fuel charges to each of the cylinders.

12. The method of starting a multi-cylinder high compression internal combustion engine having air starting and fuel admission valves, which consists in first operating the air starting valves to admit starting air to the cylinders under a sufficiently high pressure to start the pistons; then, while the air starting valves are still in operation, opening some of the fuel valves to admit more than the normal amount of fuel to some of said cylinders along with the starting air; and finally cutting the air starting valves out of operation and opening the fuel admission valves to admit fuel thereto in normal amounts.

13. The method of starting a multi-cylinder high compression internal combustion engine having air starting and fuel admission valves under load, which consists in first operating the air starting valves to start the engines by means of high pressure air; then, while the starting valves are still in operation, opening the fuel admission valves to introduce fuel in excess of the amount normally required for the load along with the starting air until the engine is brought up to the desired running speed; and finally cutting the air starting valves out of operation, and opening the fuel valves to admit only the amount of fuel normally required to carry the load at that speed.

14. The method of starting a multi-cylinder high compression internal combustion engine having air starting and fuel admission valves, which consists in first operating air starting valves to start the engine by means of high pressure air; then, while the air starting valves are still in operation, opening the fuel admission valves to introduce fuel in excess of the normal amount along with the air, the air being admitted after ignition of the fuel is started; and finally cutting the air starting valves out of operation and operating the fuel valves to admit normal amounts of fuel.

15. The method of starting a multi-cylinder internal combustion engine having air starting and fuel admission valves, under load, which consists in first operating the air starting valves to admit compressed air to the cylinders to start the engine and its load; then, while the air starting valves are still in operation, opening some of the fuel admission valves to admit fuel in excess of the normal requirements to some of said cylinders, the starting air being admitted after ignition of the fuel has started; then, while the air admission valves are still in operation, opening the fuel admission valves to admit fuel in excess of the normal requirements to all the cylinders, the starting air being admitted after ignition of the fuel is started; and finally cutting out the air admission valves and operating the fuel admission valves to admit fuel in the normal manner.

16. The method of starting a multi-cylinder high compression engine and its load, said engine having air starting and fuel admission valves which consists in operating the air starting valves to admit high pressure air to the cylinders, at the same time preventing the fuel valves from opening; then opening the fuel valves to some of the cylinders for longer than the normal working period to deliver an excess amount of fuel, and causing the other cylinders to continue their operation on air alone, admitting more than the normal amount of air to the cylinders receiving the excess supply of fuel; then operating all cylinders on excess fuel and air; and then reducing the fuel and air supplies to normal.

In witness whereof, I have hereunto set my hand this 28th day of Aug., 1912.

HENRI G. CHATAIN.

Witnesses:
C. R. DEAN,
WILLIAM T. HULSE.

Copies of this patent may be obtained for five cents each, by addressing the "Commissioner of Patents, Washington, D. C."